United States Patent [19]

Shimizu et al.

[11] Patent Number: 4,687,085
[45] Date of Patent: Aug. 18, 1987

[54] CENTRIFUGAL CLUTCH INSTANTLY ENGAGEABLE AND DISENGAGEABLE

[75] Inventors: Yasuo Shimizu; Masami Ogura, both of Kamifukuoka, Japan

[73] Assignee: Honda Giken Kogyo Kabushiki Kaisha, Tokyo, Japan

[21] Appl. No.: 510,939

[22] Filed: Jul. 5, 1983

[30] Foreign Application Priority Data

Jul. 6, 1982 [JP] Japan ................. 57-117379

[51] Int. Cl.$^4$ ............................. F16D 23/10
[52] U.S. Cl. ..................... 192/89 W; 192/103 A; 192/103 B; 192/104 C; 192/105 CD; 192/105 CE
[58] Field of Search ............ 192/89 W, 103 A, 103 B, 192/104 C, 104 R, 105 CD, 105 CE, 105 B

[56] References Cited

U.S. PATENT DOCUMENTS

| | | | |
|---|---|---|---|
| 1,745,738 | 2/1930 | Carter, Jr. | 192/103 B X |
| 1,862,951 | 6/1932 | Bignand | 192/105 B |
| 2,427,346 | 9/1947 | Banker | 192/103 A |
| 2,464,675 | 3/1949 | Dodge | 192/104 R |
| 3,672,964 | 3/1954 | Bonney | 192/105 CE |

FOREIGN PATENT DOCUMENTS

| | | | |
|---|---|---|---|
| 631600 | 11/1961 | Canada | 192/104 R |
| 472909 | 3/1929 | Fed. Rep. of Germany. | 192/105 CD |
| 898164 | 1/1982 | U.S.S.R. | 192/104 C |

Primary Examiner—Leonard E. Smith
Attorney, Agent, or Firm—Lyon & Lyon

[57] ABSTRACT

A centrifugal clutch in which a centrifugal weight is formed separately from two engaging members which are disposed for frictional engagement with each other, the centrifugal weight being displaceable in response to centrifugal force produced therein to cause one of the engaging members to engage with the other or disengage therefrom. When the centrifugal force of the centrifugal weight is smaller than a predetermined value, the two engaging members are kept in one state of engagement and disengagement, and instantly after the centrifugal force has reached the above determined value, the engaging members are shifted into the other state of engagement and disengagement. Further, the centrifugal clutch is provided with a hysteresis characteristic that the engaging rotational speed and the disengaging rotational speed are different from each other.

10 Claims, 12 Drawing Figures

CENTRIFUGAL CLUTCH INSTANTLY ENGAGEABLE AND DISENGAGEABLE

BACKGROUND OF THE INVENTION

This invention relates to a centrifugal clutch, and more particularly to a centrifugal clutch which is substantially free from slippage between clutch engaging members at engagement as well as at disengagement.

A conventional centrifugal clutch for use in transmissions or like devices is comprised of an input member, an output member, and a pair of engaging members connected, respectively, to the input member and the output member, and disposed for frictional engagement with each other to couple the input member and the output member together. One of the engaging members if formed integrally with a centrifugal weight so that the frictionally engaging force of the engaging members, i.e. the coupling force of the clutch varies in response to centrifugal force produced in the centrifugal weight. That is, the coupling force of the clutch varies in a continuous manner in response to changes in the centrifugal force of the centrifugal weight. As a consequence, when a load is applied on the clutch, there can occur a slip between the two engaging members while the coupling force has a value falling within a range between zero and a value slightly smaller than a value required by the load. Further, as the load increases, the clutch is required to have its coupling force increased to cope with the increased load, so that the range of values of the coupling force of the clutch within which the above slip can occur becomes wider. Such slip can occur both at engagement of the clutch and at disengagement of same. Moreover, engagement and disengagement of the clutch can mostly occur almost at the same rotational speed. Consequently, when the centrifugal force of the centrifugal weight varies about a value thereof which makes the coupling force of the clutch zero, there can occur fluttering or repeated alternate engagement and disengagement of the engaging members. If the clutch is held in an coupling force region where slips can occur in the engaging members, for a long period of time, or if it is used in a condition where such fluttering can frequently take place, it can result in a shortened effective life of the clutch.

SUMMARY OF THE INVENTION

It is an object of the invention to provide a centrifugal clutch which is capable of effecting in an instant manner a changeover between engagement and disengagement, while no substantial slip can occur at either of engagement and disengagement of the clutch, thereby having a prolonged life.

It is a further object of the invention to provide a centrifugal clutch which is provided with a hysteresis characteristic of the engaging and disengaging rotational speeds, and accordingly is substantially free from fluttering, thereby further prolonging its effective life.

It is another object of the invention to provide a centrifugal clutch which is capable of effecting in a positive manner the action of changeover between engagement and disengagement of the clutch.

It is a still further object of the invention to provide a centrifugal clutch which can be light in weight and compact in size.

A centrifugal clutch according to the invention includes a first engaging member connected to one of an input member and an output member, and a second engaging member connected to the other of the input and output members and movable relative to the first engaging member for frictional engagement therewith. A centrifugal weight is formed in a discrete body separate from the first and second engaging members and displaceable in response to centrifugal force produced therein. Further provided are engaging means which are responsive to displacement of the centrifugal weight for causing engagement and disengagement of the second engaging member with and from the first engaging member, and governing means for controlling the action of the engaging means. The governing means controls the action of the engaging means such that the engaging means holds the first and second engaging members in one state of engagement and disengagement when the centrifugal force of the centrifugal weight is smaller than a predetermined value, and shifts the first and second engaging members into the other state of engagement and disengagement instantly after the centrifugal force has exceeded the above predetermined value.

Preferably, the governing means is adapted to control the displacement of the centrifugal weight in such a manner that it first counteracts the centrifugal force of the centrifugal weight, then does not substantially act upon the centrifugal force, and thereafter promotes the centrifugal force. More preferably, the governing means comprises first, second and third camming surfaces continuously formed on the centrifugal weight and arranged in a direction of displacement of the centrifugal weight, and a governing spring disposed in engagement with the camming surfaces. The camming surfaces and the governing spring are disposed such that as the centrifugal weight is displaced, the governing spring counteracts the centrifugal force of the centrifugal weight while it is travelling on the first camming surface, does not substantially act upon the centrifugal force while it is travelling on the second camming surface, and promotes the centrifugal force while it is travelling the third camming surface.

Further, preferably, the aforementioned engaging means is operable to shift the first and second engaging members into the aforementioned other state of engagement and disengagement after the centrifugal weight has executed predetermined displacement from the time when the governing spring has finished passing the first camming surface.

The centrifugal clutch according to the invention includes a second spring permanently urging the second engaging member in a direction of engaging with the first engaging member, and if required, a third spring permanently counteracting the centrifugal force of the centrifugal weight.

Further, the centrifugal clutch may include a plurality of clutch mechanisms, each comprising the aforementioned second engaging member, centrifugal weight, engaging means and governing means, and interlocking means mechanically connecting the centrifugal weights of the clutch mechanisms with each other, whereby all the clutch mechanisms operate simultaneously in synchronism with each other to cause all the second engaging members to engage with or disengage from the first engaging member at the same time, thereby achieving positive changeover between engagement and disengagement of the clutch.

The above and other objects, features and advantages of the invention will be more apparent from the ensuing detailed description taken in conjunction with the accompanying drawings.

DETAILED DESCRIPTION

The invention will now be described in detail with reference to the drawings showing several embodiments of same.

Figure 1:
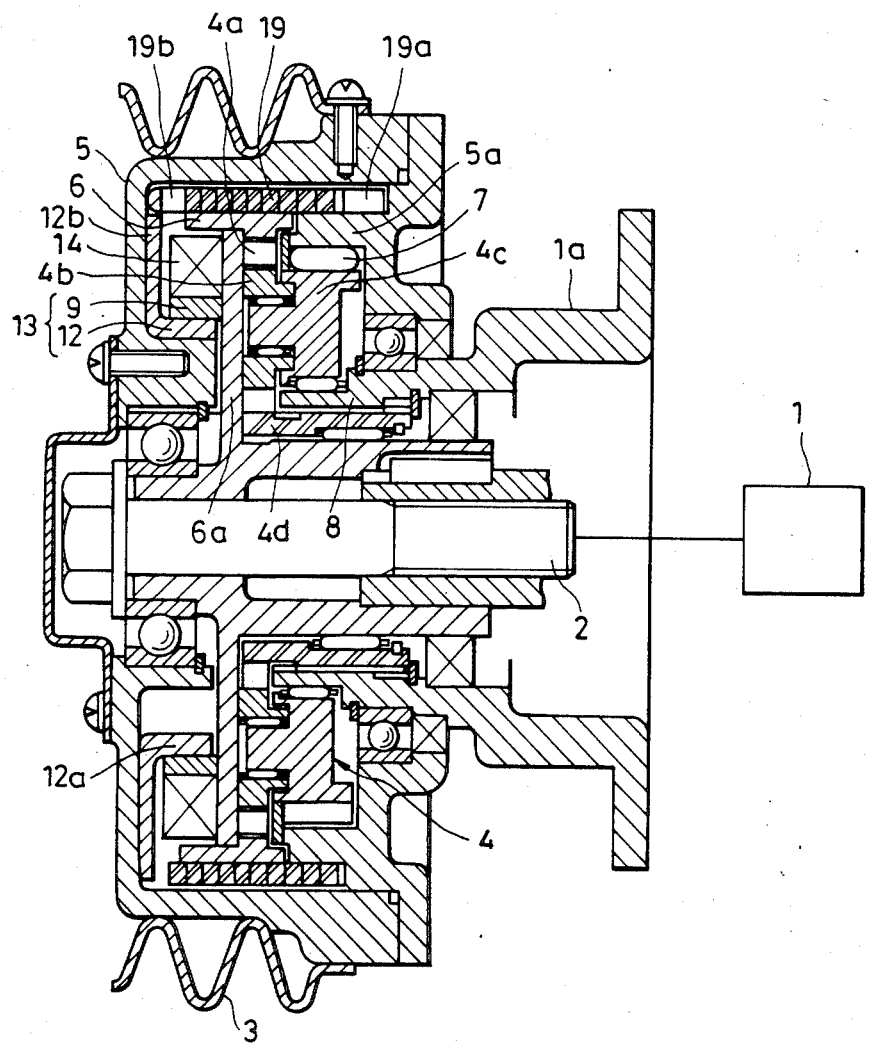
FIG. 1 is a longitudinal sectional view illustrating a centrifugal clutch according to a first embodiment of the invention, which is of the on (engagement)→off (disengagement) type and employs clutch shoes.
Figure 2:
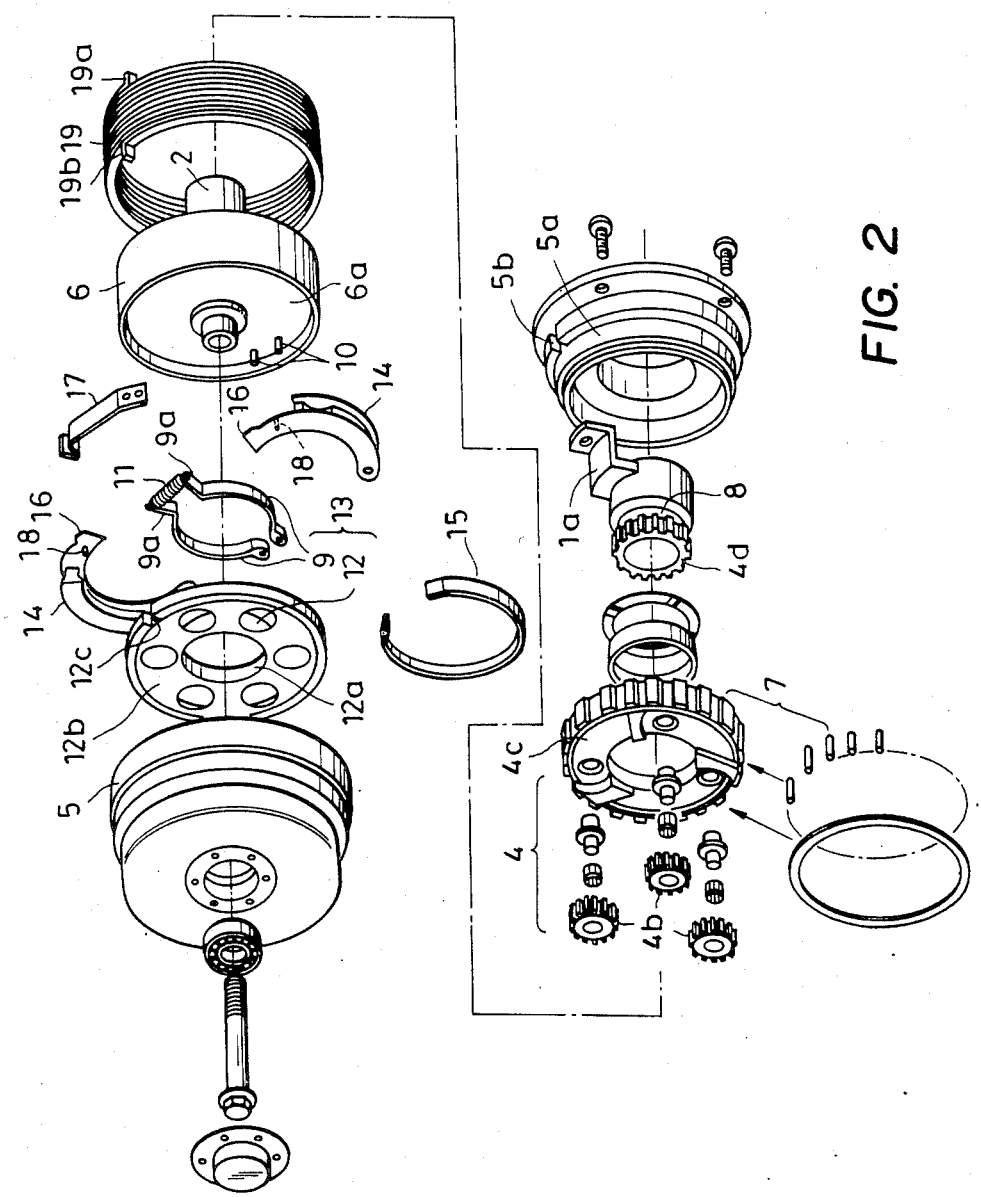
FIG. 2 is an exploded perspective view of the centrifugal clutch of FIG. 1.
Figure 3:
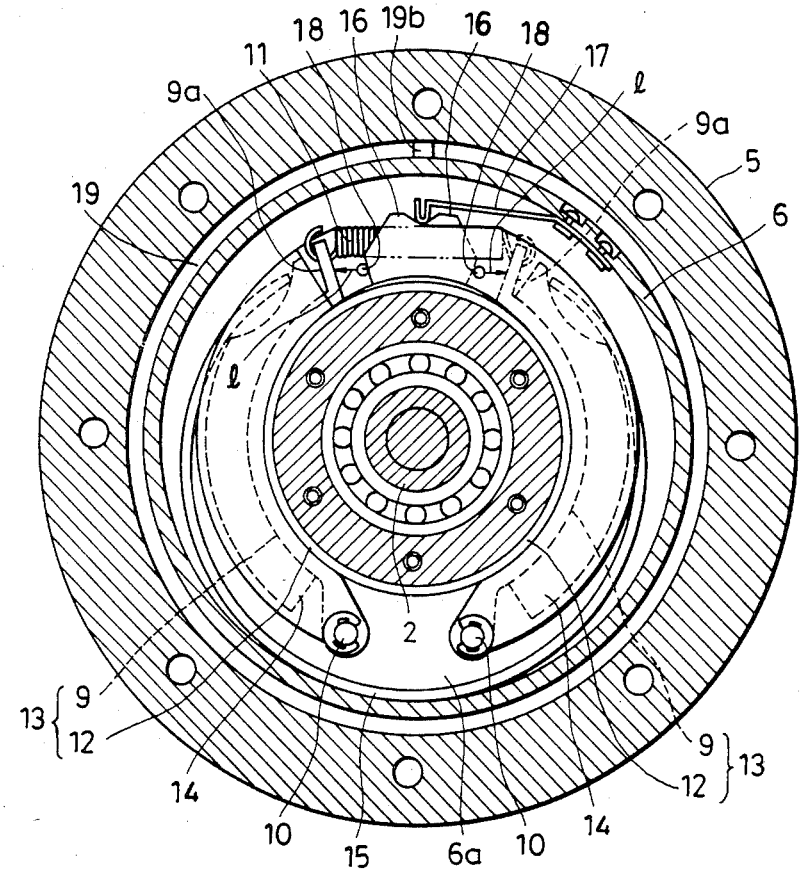
FIG. 3 is a cross-sectional view of the centrifugal clutch of FIG. 1.

Referring first to FIGS. 1 through 3, there is illustrated a first embodiment of the invention, which is of the on→off type and has a planetary reduction gear incorporated therein. In the figures, the planetary reduction gear 4 is interposed between a drive shaft 2 on the input side, connected to an engine 1 and a pulley 3 on the output side. This planetary reduction gear 4 is mounted within a hermatically sealed casing 5 which carries a pulley 3 with a plurality of engaging peripheral grooves, fitted along its outer periphery and which has its interior filled with lubricating oil. The planetary reduction gear 4 is comprised of a ring gear 4a formed by an internal gear formed on the inner peripheral surface of an input drum 6 mounted on the drive shaft 2, a plurality of (three in the illustrated embodiment) planet gears 4b meshing with the ring gear 4a, a carrier 4c carrying the planet gears 4b for rotation relative thereto, and disposed around the drive shaft 2 for free rotation, and a sun gear 4d fitted on the drive shaft 2 at an axis of the carrier 4c and meshing with the planet gears 4b. The carrier 4c is coupled with a clutch outer element 5a rigidly fastened to the casing 5, via a one-way clutch 7, and the sun gear 4d is spline-joined to a sleeve portion 8 of a case 1a of the engine 1.

The input drum 6 has a radially extending flange 6a on which are carried a pair of arcuate clutch shoes 9, 9 as a second engaging member, each having a frictional inner peripheral surface, and supported at ends on the flange 6a via a pair of supporting pins 10, 10 planted on the flange 6a. The clutch shoes 9 have their other or free ends bent parallel with each other as 9a, between which are bridged a clutch spring 11. A clutch drum 12 as a first engaging member is rotatably mounted within the casing 5, and the clutch shoes 9, 9 are disposed to embracingly grip an axial cylindrical portion 12a of the clutch drum 12, at their frictional inner peripheral surfaces to form a clutch engaging portion 13 in cooperation with the clutch drum 12. A pair of arcuate centrifugal weight members 14 forming a centrifugal weight are formed in discrete bodies separate from the clutch shoes 9 and are supported at ends on the flange 6a of the input drum 6 via the above supporting pins 10. The centrifugal weight members 14 are embraced along their outer peripheries by a weight spring 15 which is formed by an arcuate metal plate and urges the weight members 14 in a manner counteracting centrifugal force produced therein. A camming surface 16 is formed on the outer peripheral surface of a free end of each of the centrifugal weight members 14. A detent spring 17 as engaging means is secured at one end to the inner peripheral surface of the input drum 6 and engages at the other end with the above camming surface 16. The two centrifugal weight members 14 are disposed to have their free ends axially facing each other at their initial positions, and a pair of engaging pins 18, 18 are planted on the mutually facing surfaces of the free ends at predetermined locations in such a manner that when the centrifugal weight members 14 are opened about their respective supporting pins 10, 10 from the initial positions through predetermined displacement l, the engaging pins 18, 18 become engaged with the engaging bent portions 9a, 9a of the respective clutch shoes 9, 9 and thereafter, with a further opening of the centrifugal weight members 14, the engaging pins 18 push the clutch shoes 9 to correspondingly open about the supporting pins 10 against the force of the clutch spring 11. A coil-wound spring 19 having a true square or rectangular cross section is wound around the clutch outer element 5a and the input drum 6, which is in a loosened state during disengagement of the clutch. One end 19a of the coil-wound spring 19 is engaged in a groove 5b formed in the outer peripheral surface of the clutch outer element 5a and the other end 19b in a groove 12c formed in the outer peripheral surface of a radially extending flange 12b of the clutch drum 12, respectively.

Figure 4:
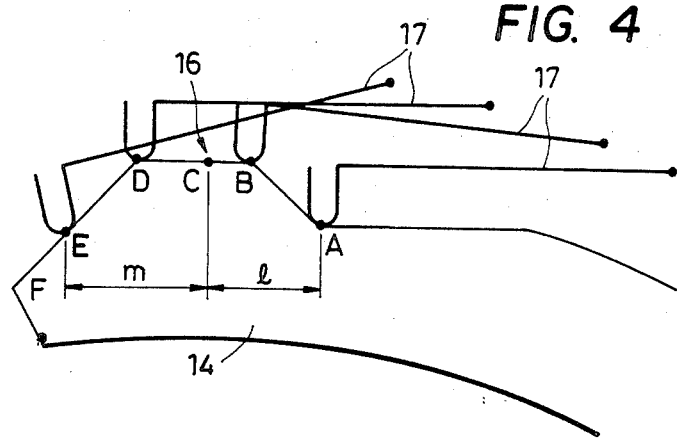
FIG. 4 is a view showing the positional relationship between the camming surfaces of the centrifugal weight of the centrifugal clutch and a detent spring.

As shown in FIG. 4, the aforementioned camming surface 16 formed on the free end portion of each of the centrifugal weight members 14 comprises a sloped surface AB ascending in the direction of opening of the centrifugal weight, a surface BCD circumferentially extending about the respective supporting pins 10 as supports for the centrifugal weight members 14, and a sloped surface DEF descending in the direction of opening of the centrifugal weight. The point C is arranged intermediate between B and D at such a location that when tip of the detent spring 17 reaches this point C, the engaging bent portion 9a of the corresponding clutch shoe 9 and the corresponding engaging pin 18 are brought into engagement with each other. The point E is arranged intermediate between D and F at such a location that when tip of the detent spring 17 reaches this point E, the outer peripheral surface of the weight spring 15 is brought into urging but damping contact with the inner peripheral surface of the input drum 6 so as to impede further opening movement of the centrifugal weight.

The operation of the first embodiment of the invention constructed as above will now be described: As the engine 1 rotates, the input drum 6 mounted on the drive shaft 2 correspondingly rotates. When the rotational speed of the input drum 6 is low, tip of the detent spring 17 is positioned at point A on the camming surface 16 in FIG. 4, wherein the clutch shoes 9 cooperatively grip the cylindrical portion 12a of the clutch drum 12 due to the force of the clutch spring 11, thus maintaining the clutch in a state of engagement. In this state, the rotation of the input drum 6 is transmitted to the clutch drum 12 which in turn renders the coil-wound spring 19 taut on the input drum 6 and the clutch outer element 5a to couple them together so that the rotation of the drive shaft 2 is transmitted to the pulley 3 on the output side with a speed ratio of 1:1. On this occasion, the ring gear 4a rotates to cause simultaneous revolutions and rotations of the planet gears 4b in the same direction as the ring gear 4a, which in turn causes rotation of the carrier 4c at a reduced speed as compared with the rotation of the ring gear 4a. Since the rotational speed of the carrier 4c which is reduced relative to the rotation of the drive shaft 2 is natuarally lower than the rotational speed of the casing 5 directly coupled to the drive shaft 2, the difference in rotational speed is absorbed by idling rotation of the one-way clutch 7 interposed between the carrier 4c and the casing 5.

As the rotational speed of the drive shaft 2 increases, the centrifugal force PW1 produced in the centrifugal weight members 14 correspondingly increases to cause gradual opening of the centrifugal weight members 14 about the respective supporting pins 10 whereby tip of the detent spring 17 travels along the sloped surface AB from the point A toward the point B. On this occasion, the force FW of the weifht spring 15 counteracting the centrifugal force PW1 of the centrifugal weight and the reaction force FD1 of the detent spring 17 acting on the sloped surface AB so as to counteract the centrifugal force PW1 of the centrifugal weight satisfy the relationship PW1=FW+FD1. While this relationship stands, no acting force is applied on the clutch shoes 9, whereby the clutch is maintained in the state of engagement, that is, it remains in a stably engaging region. Then, when the rotational speed of the drive shaft 2 further increases to a predetermined value, tip of the detent spring 17 reaches the point B on the camming surface 16. While tip of the detent spring 17 travels along the surface BCD which extends circumferentially of the corresponding supporting pin 10, the force of the detent spring 17 does not substantially act upon the centrifugal force PW1 of the centrifugal weight, so that the centrifugal weight 14, 14 rapidly expands solely against the reaction force FW of the weight spring 15 until tip of the detent spring 17 reaches the point C on the camming surface 16. The gap between the engaging pin 18 and the bent portion 19a of the clutch shoe 9 which corresponds to the distance A−C is designated by l in the figures. After the engaging pins 18 have been brought into engagement with the bent portions 9a of the respective clutch shoes 9 when tip of the detent spring 17 reaches the point C, a centrifugal force PC1 which is produced in the clutch shoes 9 which have some mass is added to the centrifugal force PW1 produced in the centrifugal weight 14, 14 until tip of the detent spring 17 reaches the point E. While the centrifugal weight is travelling along the surface CE, it is counteracted by the sum FS+FW of the reaction forces FS, FW of the weight spring 15 and the clutch spring 11. However, it is so designed that the relationship (FS+FW)<(PW1+PC1) stands so long as the rotational speed of the drive shaft 2 is maintained at least at the value assumed at the point C, along the portion CD on the camming surface 16. Therefore, the centrifugal weight 14, 14 still rapidly opens about the supporting pins 10 so that tip of the detent spring 17 rapidly reaches the point D, while maintaining its engagement with the clutch shoes 9. When tip of the detent spring 17 travels along the descending sloped surface DE after passing the point D on the camming surface 16, the reaction force of the detent spring 17 acts so as to assist or promote the combined force of the centrifugal forces PW1, PC1 of the centrifugal weight and the clutch shoes. Consequently, the mutually engaging centrifugal weight and the clutch shoes are brought into engagement with the inner peripheral surface of the input drum 6, in a damping manner via the weight spring 15, and are then prohibited from further opening. At this instant, tip of the detent spring 17 is positioned at the point E on the camming surface 16. The displacement of the centrifugal weight corresponding to the distance C−E is designated by m in the figures. As noted above, immediately after tip of the detent spring 17 has reached the point C, the centrifgal weight instantly opens to render the clutch disengaged. While tip of the detent spring 17 is travelling from the point B to the point D on the camming surface 16, the clutch is in a changeover region, and when the point D is exceeded, the clutch enters a stably disengaging region wherein the total spring force counteracting the centrifugal force along the surface DE is smaller than that along the surface DC.

When the clutch becomes disengaged, the clutch drum 12 is released from the input drum 6, and accordingly the coil-wound spring 19 with its end 19b engaged by the clutch drum 12 becomes loosened due to its own restituting force and centrifugal force caused by its own mass to relieve the clutch outer element 5a and the input drum 6 of the force coupling them together to disengage them from each other. As a consequence, the reduced speed rotation of the carrier 4c in unison with revolutions of the planet gears 4b is transmitted to the casing 5 through the clutch outer element 5a due to engagement of the one-way clutch 7, to cause reduced rotation of the pulley 3 with a reduction ratio proper to the planetary reduction gear 4.

Next, when the rotational speed of the drive shaft 2 decreases and accordingly the centrifugal force of the centrifugal weight 14, 14 is reduced to the aformentioned predetermined value, the clutch shoes 9 become contracted against the reaction force FD2 of the detent spring 17 acting upon the surface ED, due to the reaction force FW of the weight spring 15 and the reaction force FS of the clutch spring 11, so that tip of the detent spring 17 returns from the point E to the point D. As tip of the detent spring 17 travels from the point D toward the point B, the reaction force of the detent spring 17 does not substantially act upon the centrifugal weight 14, 14, and consequently the mutually engaging centrifugal weight and clutch shoes are instantly brought into the changeover region, because the sum PW2+PC2 of the centrifugal forces PW2, PC2 of the centrifugal weight and clutch shoes is exceeded by the total spring force FS+FW resisting it. When tip of the detent spring 17 comes across the point C, the centrifugal weight and the clutch shoes become disengaged from each other to bring the clutch shoes 9 into gripping engagement with the clutch drum 12 to provide a certain coupling force. After this, as tip of the detent spring 17 travels along the surface CB, the effective centrifugal force is composed solely of the component PW2 of the centrifugal weight 14, 14, while simultaneously the spring force resisting the centrifugal force is composed solely of the component FW of the weight spring 15. Since the relationship FW>PW2 then stands, the centrifugal weight 14, 14 becomes instantly contracted to instantly displace tip of the detent spring 17 toward the point A over the point B. In this way, the centrifugal weight 14 or tip of the detent spring 17 instantly passes through the surface DB, that is, the changeover region. After this, a tip of the detent spring 17 travels along the surface BA, the force of the detent spring 17 acts to promote the return of the centrifugal weight toward its initial position, thereby positively bringing the centrifugal weight to the initial position. On this occasion, the centrifugal weight members 14, 14 collidingly engages the outer peripheral surfaces of the clutch shoes 9, which promotes the clutch coupling force given by the clutch spring 11, which is constant per se, thereby bring the clutch into the stably engaging region. In the above described manner, when the rotational speed of the drive shaft 2 drops below a predetermined value, the clutch instantly becomes engaged to directly couple the drive shaft 2 on the input side and the pulley 3 on the output side together for power transmission with a speed ratio of 1:1.

Figure 5:
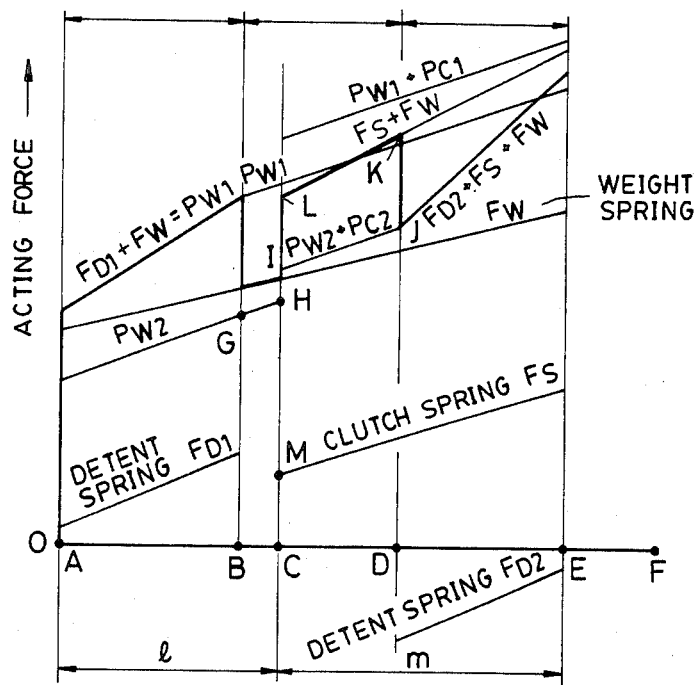
FIG. 5 is a graph showing the relationship between the centrifugal force PW of the centrifugal weight, the centrifugal force PC of the clutch shoes, the reaction force FW of a weight spring, the reaction force FS of a clutch spring, and the reaction force FD of the detent spring, plotted with respect to the camming surfaces of the centrifugal weight.
Figure 6:
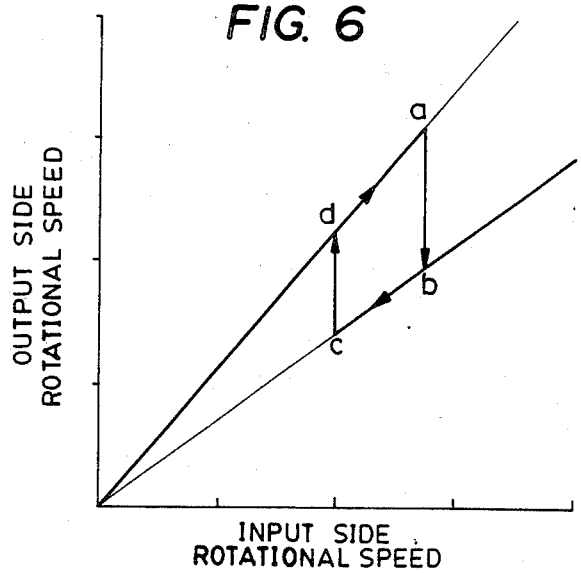
FIG. 6 is a graph showing the relationship between the rotational speed of the input shaft of a transmission employing the centrifugal clutch of the invention and the rotational speed of the output shaft of same.

FIG. 5 shows the relationship between the centrifugal force PW of the centrifugal weight, the centrifugal force PC of the clutch shoes 9, the reaction force FW of the weight spring 15, the reaction force FS of the clutch spring 11 and the reaction force FD of the detent spring 17, plotted with respect to the portions ABCDE of the camming surface 16. This figure will also be referred to in the description of further embodiments given hereinafter. FIG. 6 shows a speed change characteristic of a transmission in which the centrifugal clutch according to the invention is incorporated. From FIG. 6 it will be learned that below a pedetermined value a of the rotational speed of the drive shaft 2, the clutch is kept engaged wherein the drive shaft 2 and the output side are directly coupled together to effect a power transmission with a speed ratio of 1:1, and instantly after the predetermined speed a has been reached, the clutch becomes disengaged to effect a speed reduction wherein the transmission gear operates to provide a rotational speed b of the output side, while on the other hand, as the engine decelerates so that the output side has a rotational speed c and simultaneously the input side has a rotational speed d, the clutch instantly becomes engaged to effect a transmission of the rotational speed d from the input side to the output side with a speed ratio of 1:1. It will be noted that the rotational speed of engagement of the clutch and the rotational speed of disengagement of same differ from each other as a, d. This hysteresis characteristic is derived from the action of the detent spring 17 that while the centrifugal weight is expanding with an increase in the input side speed, the reaction force of the detent spring 17 resists the expanding motion of the centrifugal weight as the spring 17 travels along the surface AB of the camming surface 16 to thereby retard the timing of reaching the point C, whereas while the centrifugal weight is contracting with a decrease in the input side speed, the reaction force of the detent spring 17 resists the contracting motion of the centrifugal weight as the spring 17 travels along the surface ED of the camming surface 16 to also retard the timing of reaching the point C.

Further embodiments of the invention will be described with reference to FIGS. 7 through 12 wherein parts or elements corresponding to those in FIGS. 1 through 3 are designated by identical reference numerals.

Figure 7:
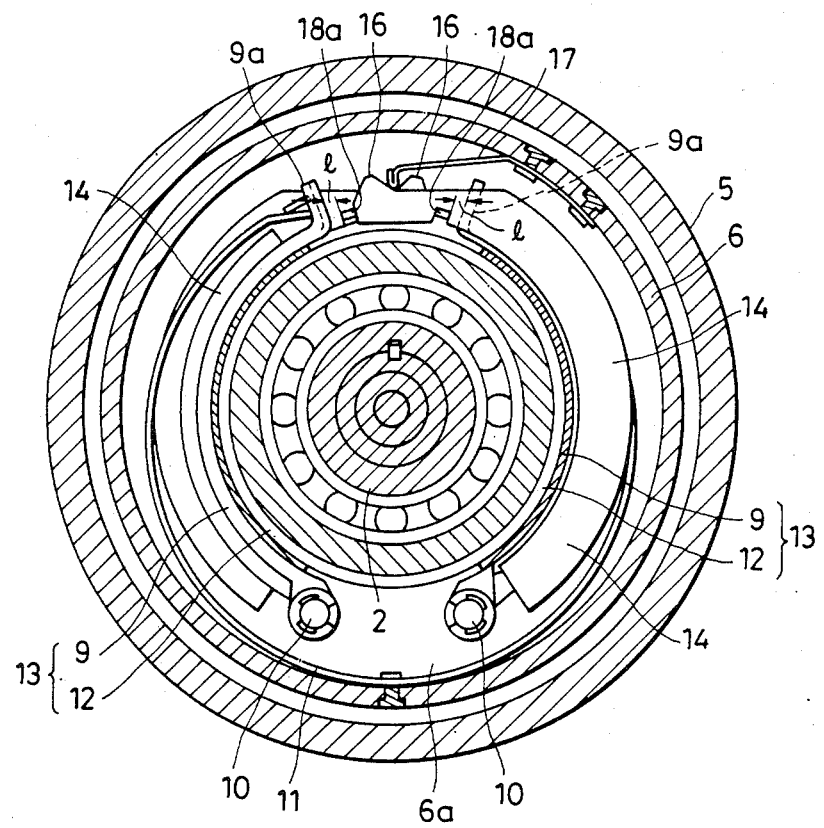
FIG. 7 is a cross-sectional view of essential part of a second embodiment of the invention, which is of the on→off type and employs clutch shoes.

FIG. 7 illustrates a second embodiment of the invention. The basic construction of this embodiment is substantially identical with that of the first embodiment shown in FIGS. 1 through 3, except that it is lacking in a spring corresponding to the weight spring 15 in the first embodiment. In the FIG. 7 embodiment, the clutch spring 11 has such a spring force characteristic that the reaction force FS of the clutch spring 11 in the present embodiment is equal to the sum FS+FW of the reaction forces of the clutch spring 11 and the weight spring 15 in the first embodiment, at the portion LK in FIG. 5. Further, according to this embodiment, the angle of inclination of the ascending sloped surface AB of the camming surface 16 is set at a larger value than that in the first embodiment, so that when tip of the detent spring 17 travels along the surface AB, a spring force equivalent to the total spring force FD1+FW obtained in the first embodiment can be obtained solely by the engagement of the detent spring 17 with the camming surface 16. In other words, the FIG. 7 embodiment is lacking in a spring reaction force which would resist the centrifugal force at the surface BC of the camming surface 16 as shown in FIG. 5. Therefore, the operation of this embodiment is distinguished from that of the first embodiment solely when the clutch shifts from a state of disengagement to a state of engagement, whereas the two embodiments have the same operation when the clutch shifts from a state of engagement to a state of disengagement.

With the clutch in a state of disengagement, when the centrifugal weight members 14 and the clutch shoes 9 have their centrifugal forces decreased to a predetermined value, tip of the detent spring 17 reaches the point D on the camming surface 16 formed on the free end of each of the centrifugal weight members. On this occasion, the force FS' of the clutch spring 11 counteracting the combined centrifugal force PW2+PC2 of the centrifugal weight and the clutch shoes is equal to the combined force FS+FW obtained in the first embodiment, and further the relationship FS'(=FS+FW)>PW2+PC2 stands. Therefore, the clutch is accelerated in the direction of engagement, with the clutch shoes 9 engaged by engaging pawls 18a which are formed by bending parts of the centrifugal weight members 14, so that tip of the detent spring 17 instantly reaches the point C on the camming surface 16. At this point C, the clutch shoes 9 and the centrifugal weight 14 become disengaged from each other to allow the clutch shoes 9 to grip the clutch drum 12 to provide a certain coupling force. As the detent spring 17 travels from the point C to the point B, the centrifugal weight is subjected to a centrifugal force of its own alone. The location of the point C is set such that the relationship of the area enclosed by the line IJKL > the area enclosed by the line BCHG in FIG. 5. Therefore, although no spring force exists which resists the centrifugal force of the centrifugal weight as tip of the detent spring 17 travels along the surface CB, the centrifugal weight can instantly contract to bring tip of the detent spring 17 to the point B. Thus, the centrifugal weight 14 can instantly pass through the changeover region. The action of the clutch from the point B to the point A on the camming surface 16 is substantially identical with that in the first embodiment, thus positively bringing the clutch to the stably engaging region.

According to the second embodiment, the coupling force of the clutch can be increased to about four times as large as that of the first embodiment, by setting the setting load of the clutch spring 11 to a larger value, without varying the weights of the centrifugal weight 14 and the clutch shoes 9 and the setting load of the detent spring 17. In FIG. 5, the segment CM represents the equivalent of the coupling force of the clutch of the first embodiment, and the segment CL the equivalent of the coupling force of the clutch of the second embodiment, respectively. Conversely, if the required equivalent of the clutch coupling force has only to correspond to the segment CM, the centrifugal weight of the second embodiment can be designed small in size, facilitating the reduction of the weight and size of the centrifugal clutch.

Figure 8:
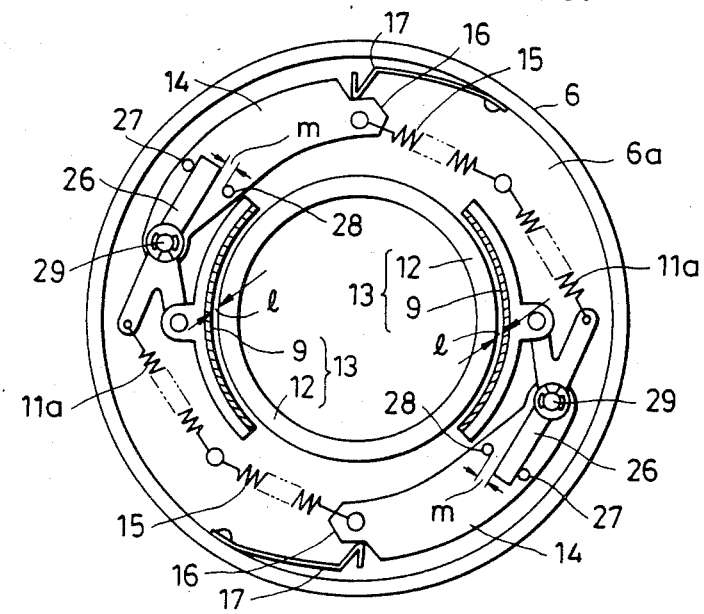
FIG. 8 is an end view of essential part of a third embodiment of the invention, which is of the off→on type and employs clutch shoes.

FIG. 8 illustrates a third embodiment of the invention, which is of the off→on type and employs clutch shoes. According to this embodiment, a pair of centrifugal weight members 14, 14 forming a centrifugal weight are mounted on a flange 6a of an input drum 6 in a diametrically symmetrical arrangement, and each have its free end connected to one end of a weight spring 15 formed by a coil spring which has the other end secured to the flange 6a of the input drum 6, in a manner being urged by the spring 15 in a direction of counteracting the centrifugal force thereof. Two clutch shoes 9, 9 as a second engaging member are each supported at its intermediate portion by a lever 26 which is pivoted to a common fulcrum 29 on which the centrifugal weight member 14 is also supported. Connected to one end of the lever 26 is one end of a clutch spring 11a formed by a coil spring and secured at the other end to the flange 6a of the input drum 6 to urge the associated clutch shoe 9 toward a clutch drum 12 as a first engaging member. Each centrifugal weight member 14 has a first engaging pin 27 planted thereon and engaging with the other end of the lever 26 so as to hold via the lever 26 the associated clutch shoe 9 spaced by a predetermined gap l from the clutch drum 12 against the force of the clutch spring 11a. When the centrifugal force produced in each centrifugal weight member 14 reaches a predetermined value so that the centrifugal weight member 14 is displaced through predetermined displacement m against the force of the associated weight spring 15 as it is released from the urging force of the detent spring 17, the first engaging pin 27 on the centrifugal weight member 14 is correspondingly displaced in a direction of disengaging from the lever 26, and then the lever 26 is urgedly displaced by the clutch spring 11a to bring the clutch shoe 9 into frictional engagement with the clutch drum 12. A second engaging pin 28 is planted on each centrifugal weight member 14 at a radially inward of the lever 26. This second engaging pin 28 is adapted to urge the clutch shoe 9 for engagement with the clutch drum 12 via the lever as the centrifugal weight member 14 is radially outwardly displaced over predetermined displacement, so as to make up for an instantaneous shortage in the coupling force of the clutch which would otherwise be caused by a sudden increase in the load upon engagement of the clutch. The location of the second engaging pin 28 determines the position of the point E in FIG. 4. As the rotational speed of the input side increases, the centrifugal clutch according to this embodiment is shifted from a state of disengagement to a state of engagement to directly couple the input side with the output side. A transmission reduction gear similar to that in the first embodiment may be incorporated in this embodiment, too, for reduction of the speed ratio during disengagement of the clutch.

Figure 9:
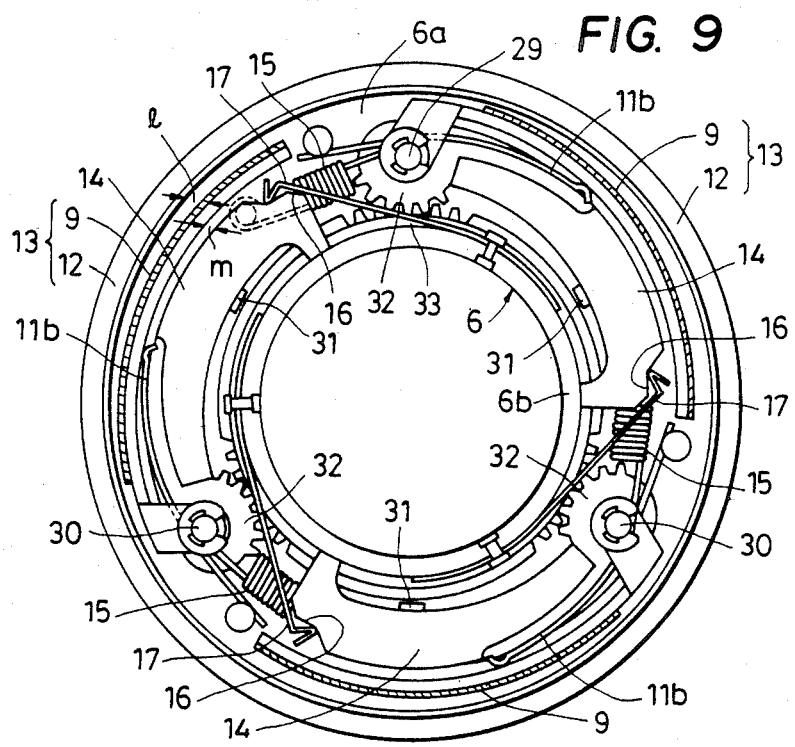
FIG. 9 is an end view of essential part of a fourth embodiment of the invention, which is of the off→on type and employs clutch shoes.

FIG. 9 illustrates a fourth embodiment according to the invention, which is of the off→on type, employing a plurality of synchronously operated clutch mechanisms, as well as clutch shoes. According to this embodiment, three fulcrums 30 are planted on a flange 6a radially outwardly extending from a cylindrical portion 6b of an input drum 6 and arranged at circumferentially equal intervals, each pivotally supporting one end of a corresponding one of three centrifugal weight members 14. Each centrifugal weight member 14 has its other or free end coupled to one end of a weight spring 15 formed by a coil spring and coupled at the other end to the fulcrum 30 of an adjacent centrifugal weight member 14, and urged by the spring 15 in a direction of counteracting the centrifugal force thereof. A clutch drum 12 as a a first engaging member is disposed around the input drum 6. Three clutch shoes 9 as second engaging members are pivotally supported at ends by the respective fulcrums 30 and urged by clutch springs 11b formed by plate springs for frictional engagement with the inner peripheral surface of the clutch drum 12. Each centrifugal weight member 14 is engaged by an engaging pawl 31 formed on each clutch shoe 9 to hold the centrifugal weight member 14 spaced by a predetermined gap l from the inner peripheral surface of the clutch drum 12 against the force of the clutch spring 11b. Three detent springs 17 are each secured at one end to the outer peripheral surface of the cylindrical portion 6b of the input drum 6, and has its tip engaging a camming surface 16 formed on an outer peripheral surface of a free end of the corresponding centrifugal weight member 16. As noted above, in the illustrated embodiment three clutch echanisms are mounted on the flange 6a of the input drum 6. A sector gear 32 is formed integrally with the perimeter of the supporting end of each centrifugal weight member 14 and meshes with a large-sized common gear 33 having an annular shape and rotatably fitted around the cylindrical portio 6b of the input drum 6.

With the above arrangement, when the rotational speed of the input drum 6 increases and accordingly the centrifugal force produced in each centrifugal weight member 14 reaches a predetermined value so that one of the three centrifugal weight members 14 starts to radially outwardly rotate about its fulcrum 30, the sector gear 32 formed with the above one centrifugal weight member 14 radially outwardly rotates in unison with the rotation of the latter. The rotation of the above sector gear 32 is transmitted through the large-sized gear 33 to the other sector gears 32 to thereby cause simultaneous rotations of all the three centrifugal weight members 14 in the same direction. When each centrifugal weight member 14 and the associated clutch shoe 9 are radially outwardly displaced through the predetermined gap m while they are maintained in a mutually engaged state, the clutch shoe 9 is brought into frictional engagement with the inner peripheral surface of the clutch drum 12 to provide a coupling force corresponding to the force of the clutch spring 11b and the centrifugal force of the clutch shoe 9. At the same time, the centrifugal weight member 14 becomes disengaged from the engaging pawl 31. The acting force of the weight spring 15 which counteracts the centrifugal force of the centrifugal weight member 14 alone cannot impede the radially outward movement of the centrifugal weight member 14, and therefore the centrifugal weight member 14 continues its radially outward movement until its outer peripheral surface is brought into engagement with the inner peripheral surface of the clutch shoe 9. Upon completion of the radially outward movement of the centrifugal weight member 14, tip of the detent spring 17 is positioned on a point on the camming surface 16, which corresponds to the point E in FIG. 4. On the other hand, when the rotational speed of the input drum 6 decreases and accordingly the centrifugal force of the centrifugal weight member 14 reaches a predetermined value so that the centrifugal weight member 14 is released from the acting force of the detent spring 17, the centrifugal weight member 14 is radially inwardly displaced through a predetermined gap m and then the clutch shoe 9 follows the radially inward displacement of the centrifugal weight member 14 into engagement therewith, to thereby disengage the clutch shoe 9 from the clutch drum 12. Thus, the clutch is disengaged into its initial position.

As stated above, according to this embodiment, since a plurality of clutch mechanisms are interlocked with each other by means of mechanically interlocking means comprising sector gears formed with the supporting ends of the centrifugal weight members 14 and the large-sized gear 33 meshing with the sector gears, all the clutch mechanisms are concurrently operated in synchronism with each other. This arrangement can avoid slippage in one or more clutch shoes 9 due to a shortage in the coupling force of the clutch upon engagement of same, as well as abnormal abrasion of the clutch engaging portion to be caused by the slippage.

Figure 10:
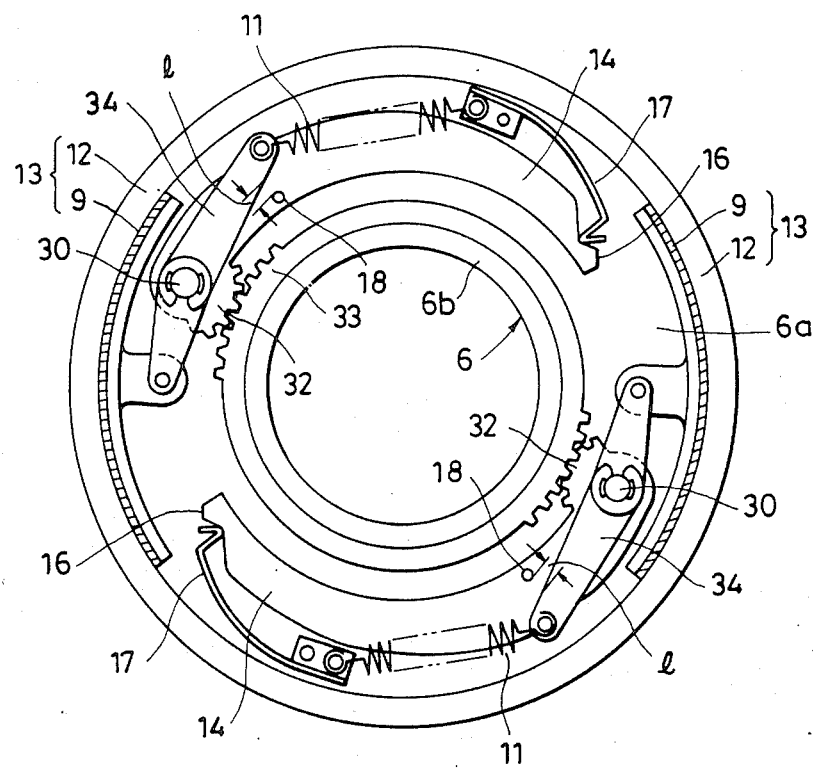
FIG. 10 is an end view of essential part of a fifth embodiment of the invention; which is of the on→off type and employs clutch shoes.

FIG. 10 illustrates a fifth embodiment of the invention. This embodiment also employs a plurality of synchronously operated clutch mechanisms using clutch shoes, but which is of the on→off type as distinct from the fourth embodiment. Further, in this embodiment, two clutch mechanisms are used as distinct from the fourth embodiment, but its principle of operation is substantially identical with that of the fourth embodiment. Two clutch shoes 9, 9, as second engaging members are each connected at its intermediate portion as one end of a lever 34 which is pivoted at its intermediate portion to a fulcrum 30 planted on a flange 6a of an input drum 6 and has its other end connected to one end of a clutch spring 11 formed by a coil spring, with its other end secured to the flange 6a of the input drum 6. Thus, each clutch shoe 9 is urgedly maintained in frictional engagement with the inner peripheral surface of a clutch drum 12 as a first engaging member, by the clutch spring 11 via the lever 34. Two centrifugal weight members 14, 14 are each pivotally supported at one end by a corresponding one of the above fulcrums 30, and its supporting end is formed integrally with a sector gear 32 meshing with a large-sized common annular gear 33 rotatably fitted around a cylindrical portion 6b of the input drum 6, thereby mechanically interlocking the centrifugal weight members 14 with each other, in the same manner as in the fourth embodiment. As the rotational speed of the input drum 6 increases and accordingly the centrifugal force of either one of the centrifugal weight members 14 reaches a predetermined value, the centrifugal weight member 14 becomes released from the acting force of a corresponding detent spring 17 and accordingly is radially outwardly displaced so that the second gear 32 formed with the same centrifugal weight member 14 is rotated to thereby cause concurrent rotations of the other centrifugal weight member in the same direction through the large-sized common gear 33 and the other sector gear 32. After each centrifugal weight member 14 has executed predetermined displacement l, an engaging pin 18 on the centrifugal weight member becomes engaged with the associated lever 34 so that the associated clutch 9 becomes disengaged from the clutch drum 12 against the force of the clutch spring 11. In this way, all the two clutch mechanisms become disengaged at the same time. On the other hand, as the rotational speed of the input drum 6 decreases and accordingly the centrifugal force of either one of the centrifugal weight members 14 drops below a predetermined value, an action reverse to the above takes place to bring the clutch shoes 9 into engagement with the clutch drum 12.

While all the foregoing embodiments employ clutch shoes as second engaging members, the following embodiments employ mutiple discs as second engaging members.

Figure 11:
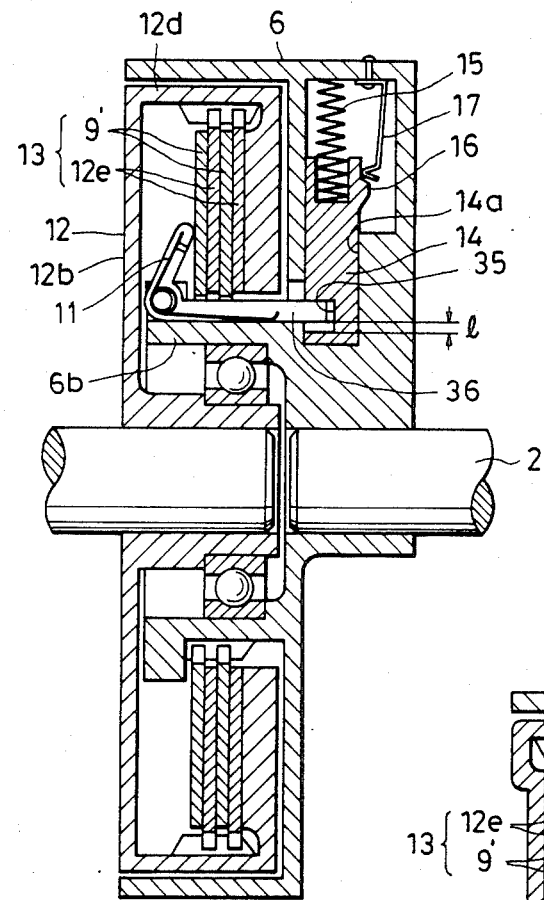
FIG. 11 is a longitudinal sectional view of essential part of a sixth embodiment of the invention, which is of the on→off type and employs multiple clutch discs.

FIG. 11 shows a sixth embodiment of the invention, which is of the on→off type and employs mutiple clutch discs. According to this embodiment, a plurality of, e.g. two, clutch discs 9' as a second engaging member which have frictional side surfaces are spline-fitted in a cylindrical boss portion 6b of an input drum 6 mounted on a drive shaft 2, while they are allowed to make axial movement. On the other hand, a plurality of, e.g. two, clutch discs 12e having frictional side surfaces as a first engaging member are axially movably spline-fitted in the inner peripheral surface of an outer cylindrical portion 12d axially extending from the outer periphery of a flange 12b of a clutch drum 12. The clutch discs 9' and the clutch discs 12e are alternately superimposed one upon another, forming the engaging portion of the clutch. A centrifugal weight 14 is accommodated within a weight chamber 14a radially formed in the outer peripheral surface of the cylindrical boss portion 6b of the input drum 6, and urged by a weight spring 15 in a direction of counteracting its centrifugal force. The centrifugal weight 14 is formed with a camming surface 16 as in the foregoing embodiments, which is engaged by tip of a detent spring 17 secured at one end to the input drum 6. A radially inner portion of the centrifugal weight 14 has a side surface formed with an engaging groove 35 in which is received one end of a lever 36 as engaging means, having an L-shaped configuration which is supported at its intermediate portion by the cylindrical boss portion 6b of the input drum 6 and has its other end disposed for engaging the centrifugal weight 14 with an outermost one of the clutch discs 9'. A clutch spring 11 formed by a torsional coil spring is mounted on the lever 36 to urge the lever 36 against the outermost clutch disc 9'. Thus, when the centrifugal weight 14 is inoperative in its initial position, the input side clutch discs 9' are maintained in frictional engagement with the output side clutch discs 12e by means of the weight spring 15 and the clutch spring 11 via the lever 36. The engaging groove 35 formed in the centrifugal weight 14 has such an inner diameter that a gap 1 can be defined between one end of the lever 36 fitted in the groove 35 and its inner peripheral wall, so that when the centrifugal weight 14 is radially outwardly displaced beyond predetermined displacement 1, the other end of the lever 36 becomes disengaged from the outermost clutch disc 9'.

With the above arrangement, when the rotational speed of the input drum 6 increases and accordingly the centrifugal force produced in the centrifugal weight 14 reaches a predetermined value, the centrifugal weight 14 starts to be radially outwardly displaced against the force of the weight spring 15. After the centrifugal weight 14 has executed predetermined displacement 1, it becomes engages with the one end of the lever 36, and then with further displacement, it causes the lever 36 to rotate counterclockwise as viewed in FIG. 11, against the force of the clutch spring 11, to cause disengagement of the input side clutch discs 9' from the output side clutch discs 12e.

Figure 12:
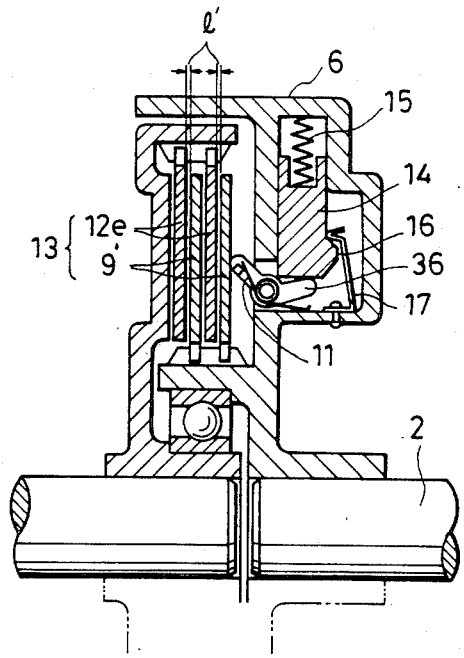
FIG. 12 is a longitudinal sectional view of essential part of a seventh embodiment of the invention, which is of the off→on type and employs mutiple clutch discs.

FIG. 12 shows a seventh embodiment of the invention, which is of the off→on type and employs mutiple clutch discs. In this embodiment, a centrifugal weight 14 is urged by a weight spring 15, both arranged in a similar manner to the sixth embodiment and counteracting the centrifugal force of the weight 14, so as to hold input side clutch discs 9' spaced from output side clutch discs 12e, by means of a lever 36 for engagement of the centrifugal weight 14 with the clutch discs 9', and against the force of a clutch spring 11 acting upon the lever 36. With the clutch thus disengaged, the input side clutch discs 9' and the output side clutch discs 12e are slightly spaced from each other by a gap 1', the sum of which forms predetermined displacement 1 of the centrifugal weight 14. From this position, as the centrifugal weight 14 is radially outwardly displaced due to its own centrifugal force, the lever 36 is rotated clockwise as viewed in FIG. 12, by the force of the clutch spring 11 acting upon the lever 36 to urgingly displace the outermost clutch disc 9'. When the outermost clutch disc 9', i.e. the centrifugal weight 14 has executed the predetermined displacement 1 corresponding to the sum of the gaps 1', the input side clutch discs 9' are brought into frictional engagement with the output side clutch discs 12e.

The centrifugal clutchs according to the invention having the above described arrangements and operations provide excellent results as below:

a. Since the centrifugal weights are provided in discrete bodies separate from the engaging members directly taking part in engagement and disengagement of the clutch, for acting upon the engaging members after its centrifugal force has reached a predetermined value, the clutch can instantly shift from a state of engagement to a state of disengagement or vice versa. Therefore, despite the centrifugal type, the time required for changeover between engagement and disengagement can be designed much smaller than that of the electromagnetic type;

b. Since the coupling force of the clutch is not hindered by the centrifugal force of the centrifugal weight, no substantial slippage occurs between the engaging members upon engagement as well as upon disengagement;

c. Since the means for causing the centrifugal weight to act upon the engaging portion of the clutch after the centrifugal force of the centrifugal weight has reached a predetermined value is formed by detent means formed by a camming surface formed on a free end of the centrifugal weight and a detent spring disposed to counteract the centrifugal movement of the centrifugal weight, a hysteresis characteristic is imparted to the input side rotational speeds for engagement and disengagement of the clutch so as to provide a suitable difference between the engaging speed and the disengaging speed with accuracy. This can eliminate the occurrence of fluttering of the clutch engaging portion upon engagement of the clutch as well as upon disengagement thereof, thereby avoiding unnecessary speed changing actions and prolonging the effective life of the clutch;

d. The provision of a plurality of clutch mechanisms having respective centrifugal clutches mutually interlocked for synchronous actions can make the operation of the clutch positive and stable, ensuring uniform operation of the clutch even with variations between the operating characteristics of the individual clutch mechanisms, thereby avoiding local abrasion and local overheating in the clutch, etc.

What is claimed is:

1. A centrifugal clutch comprising: an input member; an output member; a first engaging member connected to one of said input member and said output member; and a second engaging member connected to the other of said input member and said output member and movable relative to said first engaging member for frictional engagement therewith; a centrifugal weight formed in a discrete body separate from said first and second engaging members and displaceable in response to centrifugal force produced therein; engaging means responsive to displacement of said centrifugal weight for causing engagement and disengagement of said second engaging member with and from said engaging member; and governing means for controlling the action of said engaging means, said governing means being adapted to control the action of said engaging means such that said engaging means holds said first and second engaging members in one state of engagement and disengagement when the centrifugal force of said centrifugal weight is smaller than a predetermined value, and shifts said first and second engaging members into the other state of engagement and disengagement instantly after the centrifugal force of said centrifugal weight has reached said predetermined value; wherein said governing means is adapted to control the displacement of said centrifugal weight in a manner such that said governing means first counteracts the centrifugal force of said centrifugal weight, then does not substantially act upon the centrifugal force of said centrifugal weight, and thereafter promotes the centrifugal force of said centrifugal weight.

2. A centrifugal clutch as claimed in claim 1, wherein said first engaging member comprises a cylindrical member having an outer peripheral surface, and said second engaging member comprises an arcuate member having a frictional inner peripheral surface disposed for frictional engagement with said outer peripheral surface of said first engaging member.

3. A centrifugal clutch as claimed in claim 1, wherein said governing means comprises first, second and third camming surfaces continuously formed on said centrifugal weight and arranged in a direction of displacement of said centrifugal weight, and a governing spring disposed in engagement with said first, second and third camming surfaces, said camming surfaces and said governing spring being disposed such that as said centrifugal weight is displaced, said governing spring counteracts the centrifugal force of said centrifugal weight while it is travelling on said first camming surface, does not substantially act upon the centrifugal force of said centrifugal weight while it is travelling on said second camming surface, and promotes the centrifugal force of said centrifugal weight while it is travelling on said third camming surface.

4. A centrifugal clutch as claimed in claim 3, wherein said engaging means is operable to shift said first and second engaging members into said other state of engagement and disengagement after the centrifugal weight has executed predetermined displacement from the time when said governing spring has finished passing said first camming surface.

5. A centrifugal clutch as claimed in claim 3 or claim 4, including a second spring permanently urging said second engaging member in a direction of engaging with said first engaging member.

6. A centrifugal clutch as claimed in claim 5, including a third spring permanently counteracting the centrifugal force of said centrifugal weight.

7. A centrifugal clutch comprising: an input member; an output member; a first engaging member connected to one of said input member and said output member; a plurality of clutch mechanisms, each comprising a second engaging member connected to the other of said input member and said output member and movable relative to said first engaging member for frictional engagement therewith, a centrifugal weight formed in a discrete body separate from said first and second engaging members and displaceable in response to centrifugal force produced therein, engaging means responsive to displacement of said centrifugal weight for causing engagement and disengagement of said second engaging member with and from said first engaging member, and governing means for controlling the action of said engaging means, said governing means being adapted to control the action of said engaging means such that said engaging means holds said first and second engaging members in one state of engagement when the centrifugal force of said centrifugal weight is smaller than a predetermined value, and shifts said first and second engaging members into the other state of engagement and disengagement instantly after the centrifugal force of said centrifugal weight has reached said predetermined value; and interlocking means mechanically connecting said centrifugal weights of said clutch mechanisms with each other, whereby all said clutch mechanisms operate simultaneously in synchronism with each other to cause all said second engaging members to engage with or disengage from said first engaging member at the same time; wherein said governing means is adapted to control the displacement of said centrifugal weight in a manner such that said governing means first counteracts the centrifugal force of said centrifugal weight, then does not substantially act upon the centrifugal force of said centrifugal weight, and thereafter promotes the centrifugal force of said centrifugal weight.

8. A centrifugal clutch as claimed in claim 7, wherein said interlocking means comprises a common gear, and a plurality of sector gears, each rotatable in unison with a corresponding one of said centrifugal weights and meshing with said common gear.

9. A centrifugal clutch as claimed in claim 1 or claim 7, wherein said first engaging member comprises a cylindrical member having an inner peripheral surface, and said second engaging member comprises an arcuate member having a frictional outer peripheral surface disposed for frictional engagement with said inner peripheral surface of said first engaging member.

10. A centrifugal clutch as claimed in claim 1 or claim 7, wherein said first and second engaging members each comprise a plurality of frictional discs, said frictional discs of said first engaging member and said frictional discs of said second engaging member being alternately superimposed one upon another.

* * * * *